United States Patent [19]
Stedman

[11] 3,829,173
[45] Aug. 13, 1974

[54] SEALED PIN JOINT FOR TRACK ASSEMBLIES

[75] Inventor: Robert N. Stedman, Chillicothe, Ill.

[73] Assignee: Caterpillar Tractor Co., Peoria, Ill.

[22] Filed: Apr. 27, 1973

[21] Appl. No.: 355,202

[52] U.S. Cl.................... 305/11, 305/14, 308/36.1
[51] Int. Cl.......................................... B62d 55/20
[58] Field of Search............ 305/11, 14, 58; 74/257; 308/36.1

[56] References Cited
UNITED STATES PATENTS
3,522,962  8/1970  Iverson et al. ................ 305/11 X
3,554,588  1/1971  Reinsma et al. ................ 305/58 X Primary Examiner—M. Henson Wood, Jr.
Assistant Examiner—Michael Y. Mar
Attorney, Agent, or Firm—Phillips, Moore, Weissenberger, Lempio & Strabala

[57] ABSTRACT

A track assembly comprises a plurality of shoes closely coupled together by a pair of articulated link assemblies. Each link assembly comprises a plurality of fork and blade type links pivotally mounted together by a tubular pin and a pair of annular bearings. An annular seal and retaining means therefor are disposed on an outboard side of each of the bearings.

27 Claims, 2 Drawing Figures

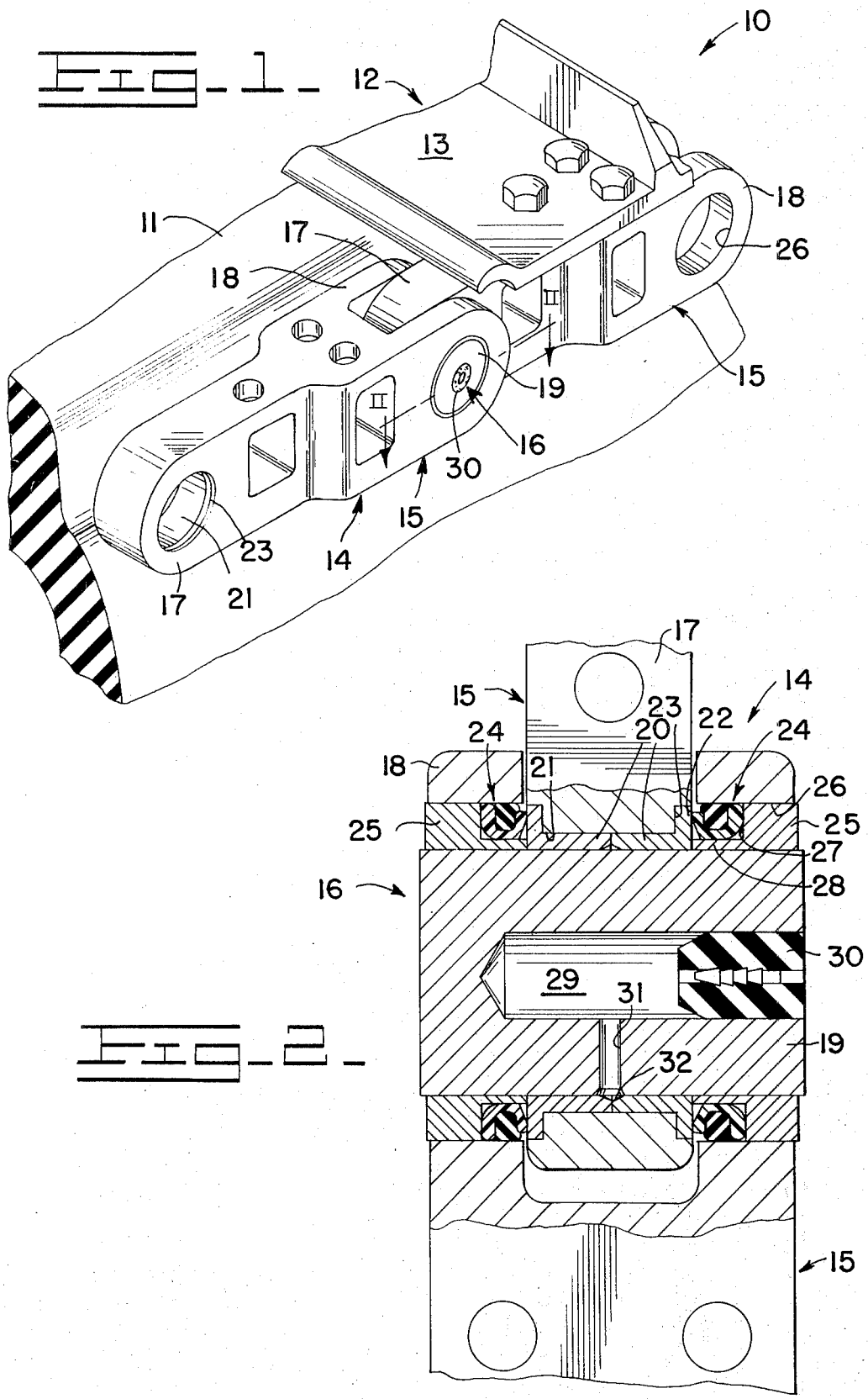

SEALED PIN JOINT FOR TRACK ASSEMBLIES

BACKGROUND OF THE INVENTION

The pin joints for the track assemblies employed in the cushioned track disclosed in U.S. Pat. No. 3,601,212 may be left unsealed when the underfooting for the cushioned track is dry. However, when such underfooting constitutes wet and abrasive soil conditions, the pin joints tend to wear unduly, thus necessitating periodic replacement thereof. FIGS. 19 and 20 of such patent, as well as U.S. Pat. Nos. 3,390,922 and 3,601,454, illustrate various sealed track pin joints which alleviate such wear problem.

SUMMARY OF THE INVENTION

An object of this invention is to provide an economical, non-complex and durable sealed pin joint for endless track assemblies which is adapted for expeditious assembly. The sealed pin joint comprises a pair of circumferentially adjacent fork and blade type link members pivotally mounted together by a tubular pin and a pair of annular bearings pivotally mounting the blade end of one of the links on the pin. An annular sealing means is disposed in sealing relationship on an outboard side of each of the bearings and retention means are employed thereat to retain the sealing means in such sealing relationship.

BRIEF DESCRIPTION OF THE DRAWINGS

Further objects of this invention will become apparent from the following description and accompanying drawings wherein:

FIG. 1 partially illustrates a cushioned track comprising a driver having a track assembly employing sealed pin joints of this invention therein; and FIG. 2 is an enlarged sectional view, taken in the direction of arrows II—II in FIG. 1, illustrating a single pin joint.

DETAILED DESCRIPTION

FIG. 1 partially illustrates a cushioned track 10 adapted to replace conventional tires or the like employed on standard construction equipment, such as wheel-type tractors. The cushioned track, fully disclosed in above-mentioned U.S. Pat. No. 3,601,212, essentially comprises an annular resilient spacer means or driver 11 having a substantially annular and polygonal-shaped endless track assembly 12 mounted completely therearound. The endless track assembly comprises a plurality of closely coupled ground engaging track shoes 13 (one shown) bolted or otherwise suitably secured to a pair of laterally spaced articulated link assemblies 14 (one shown).

Each link assembly comprises a plurality of identical and unitary links 15 with each circumferentially adjacent pair of first and second links pivotally mounted together by sealed pivot means 16 of this invention. Referring to FIG. 2, the pivot means pivotally mounts a blade end 17 of the first link in a fork end 18 of the second link and comprises a cylindrical pin 19 and a pair of identical annular sleeve bearings 20 pivotally mounting blade end 17 on the pin.

Each bearing is disposed in a cylindrical bore 21 formed through blade end 17 and has a flange 22 which extends radially outwardly into a recess 23. An annular crescent type sealing means 24 is disposed in sealing relationship on an outboard side of each flange. The sealing means may be of the type disclosed in U.S. Pat. No. 3,390,922.

A pair of identical retention means, such as an annular ring 25, are press-fitted into a bore 26 formed through the fork end of the second link and each have an annular recess 27 for mounting a sealing means therein. Each retention means is mounted on an outboard side of a respective sealing means and is further disposed radially between the fork end of the second link and the pin for retaining the sealing means in its sealing relationship with a respective bearing. In addition, each retention means comprises an axially inwardly extending bearing retaining portion 28 which engages a respective bearing to retain it in a fixed position.

Pin 19 has a chamber 29 of a lubrication means formed therein adapted to be filled with lubricant, such as grease or oil, upon removal of a rubber fill plug means 30. The chamber communicates such lubricant between the bearings and pin via at least one radially disposed port 31, formed through a sidewall of the pin and an annular groove 32. The groove is formed internally on the bearings, at the inwardly disposed and abutting ends thereof, and is disposed at a radially outward termination of the port to receive and communicate lubricant circumferentially around the groove.

Upon assembly of the sealed track joint, blade end 17 of the first link may be disposed within fork end 18 of the second link with bearings 20 pre-positioned on such blade end. Pin 19 may be then inserted into the conforming internal bore of the bearings. Alternatively, the bearings could be inserted into position after the pin has been positioned between the links.

Each retention means 25, having sealing means 24 predisposed thereon, are then press-fitted into bores 26. Retaining portions 28 of the retention means will engage on outboard sides of the bearings to precisely position the bearings and to also move the sealing means into sealing contact with flanges 22. Plug 30 may be then removed to fill chamber 29 with a lubricant.

It should be noted that the construction and disposition of flanges 22 provide for the removal of only a minimum amount of material from blade end 17 of the first link to insure maximum strength thereat. In addition, the flanges provide a substantially large and smooth surface area contact for the sealing means to insure maximum seal life. Since the outer diameters of flanges 22 are slightly less than the internal diameter of bore 26, installation of the bearings into their FIG. 2 positions on pin 19 is readily facilitated. In addition, portions 28 of the retention means function as thrust rings or spacers to precisely load the sealing means during assembly to prevent damage thereto.

What is claimed is:

1. An articulated link assembly adapted for use in a track assembly comprising
    a pair of circumferentially adjacent first and second links, each of said links having a blade end and an opposite fork end,
    pivot means pivotally mounting the blade end of said first link in the fork end of said second link comprising a pin and a pair of annular bearings pivotally mounting the blade end of said first link on said pin, annular sealing means disposed in sealing relationship on an outboard side of each of said bearings, and retention means disposed on an outboard side of each of said sealing means and further disposed radially between the fork end of said second link and said pin for retaining such sealing means in said sealing relationship with a respective one of said bearings.

2. The link assembly of claim 1 wherein each of said first and second links constitutes a unitary construction.

3. The link assembly of claim 1 wherein said pin is cylindrical and has a substantially uniform outer diameter throughout its axial length.

4. The link assembly of claim 1 wherein each of said bearings is disposed in a bore formed in the blade end of said first link and further comprises a flange extending radially outwardly into a like-shaped recess formed on a respective outboard side of said blade end.

5. The link assembly of claim 1 wherein inner ends of said bearings abut each other.

6. The link assembly of claim 4 wherein each of said sealing means sealingly engages an outboard side of a respective one of said flanges.

7. The link assembly of claim 1 wherein each of said retention means comprises an annular ring secured radially between said pin and the fork end of said second link.

8. The link assembly of claim 7 further comprising an annular recess formed in each of said rings and wherein one of said sealing means is disposed in each of said recesses.

9. The link assembly of claim 4 wherein each of said retention means comprises a ring mounted in a bore formed axially through the fork end of said second link and wherein the outer diameter of the flange of each of said bearings is less than the diameter of each of said bores.

10. The link assembly of claim 7 wherein each of said rings has a portion extending axially inwardly into abutting relationship with an outboard side of a respective one of said bearings.

11. The link assembly of claim 1 further comprising lubrication means defined in said pin for continuously supplying lubricant between said bearings and said pin.

12. The link assembly of claim 11 wherein said lubrication means comprises a chamber formed in said pin, removable plug means normally closing an end of said chamber and at least one port formed radially through a sidewall of said pin.

13. The link assembly of claim 12 wherein said lubrication means further comprises an annular groove formed internally on said bearings, at adjacent inner ends thereof, and disposed at a radially outward termination of said passage for receiving and communicating lubricant circumferentially therearound.

14. The link assembly of claim 1 further comprising a resilient driver and a track assembly mounted on said driver comprising at least one track shoe secured to said link assembly.

15. A sealed pin joint comprising a pair of circumferentially adjacent first and second members, each of said members having a blade end and an opposite fork end, pivot means pivotally mounting the blade end of said first member in the fork end of said second member comprising a pin and a pair of annular bearings pivotally mounting the blade end of said first member on said pin, annular sealing means disposed in sealing relationship on an outboard side of each of said bearings, and retention means disposed on an outboard side of each of said sealing means and further disposed radially between the fork end of said second member and said pin for retaining such sealing relationship with a respective one of said bearings.

16. The sealed joint of claim 15 wherein each of said first and second members constitutes a unitary construction.

17. The sealed joint of claim 15 wherein said pin is cylindrical and has a substantially uniform outer diameter throughout its axial length.

18. The sealed joint of claim 15 wherein each of said bearings is disposed in a bore formed in the blade end of said first member and further comprises a flange extending radially outwardly into a like-shaped recess formed on a respective outboard side of said blade end.

19. The sealed joint of claim 15 wherein inner ends of said bearings abut each other.

20. The sealed joint of claim 18 wherein each of said sealing means sealingly engages an outboard side of a respective one of said flanges.

21. The link assembly of claim 15 wherein each of said retention means comprises an annular ring secured radially between said pin and the fork end of said second member.

22. The sealed joint of claim 21 further comprising an annular recess formed in each of said rings and wherein one of said sealing means is disposed in each of said recesses.

23. The sealed joint of claim 18 wherein each of said retention means comprises a ring mounted in a bore formed axially through the fork end of said second member and wherein the outer diameter of the flange of each of said bearings is less than the diameter of each of said bores.

24. The sealed joint of claim 21 wherein each of said rings has a portion extending axially inwardly into abutting relationship with an outboard side of a respective one of said bearings.

25. The sealed joint of claim 15 further comprising lubrication means defined in said pin for continuously supplying lubricant between said bearings and said pin.

26. The sealed joint of claim 25 wherein said lubrication means comprises a chamber formed in said pin, removable plug means normally closing an end of said chamber and at least one port formed radially through a sidewall of said pin.

27. The sealed joint of claim 26 wherein said lubrication means further comprises an annular groove formed internally on said bearings, at adjacent inner ends thereof, and disposed at a radially outward termination of said passage for receiving and communicating lubricant circumferentially therearound.

* * * * *